Figure 1:
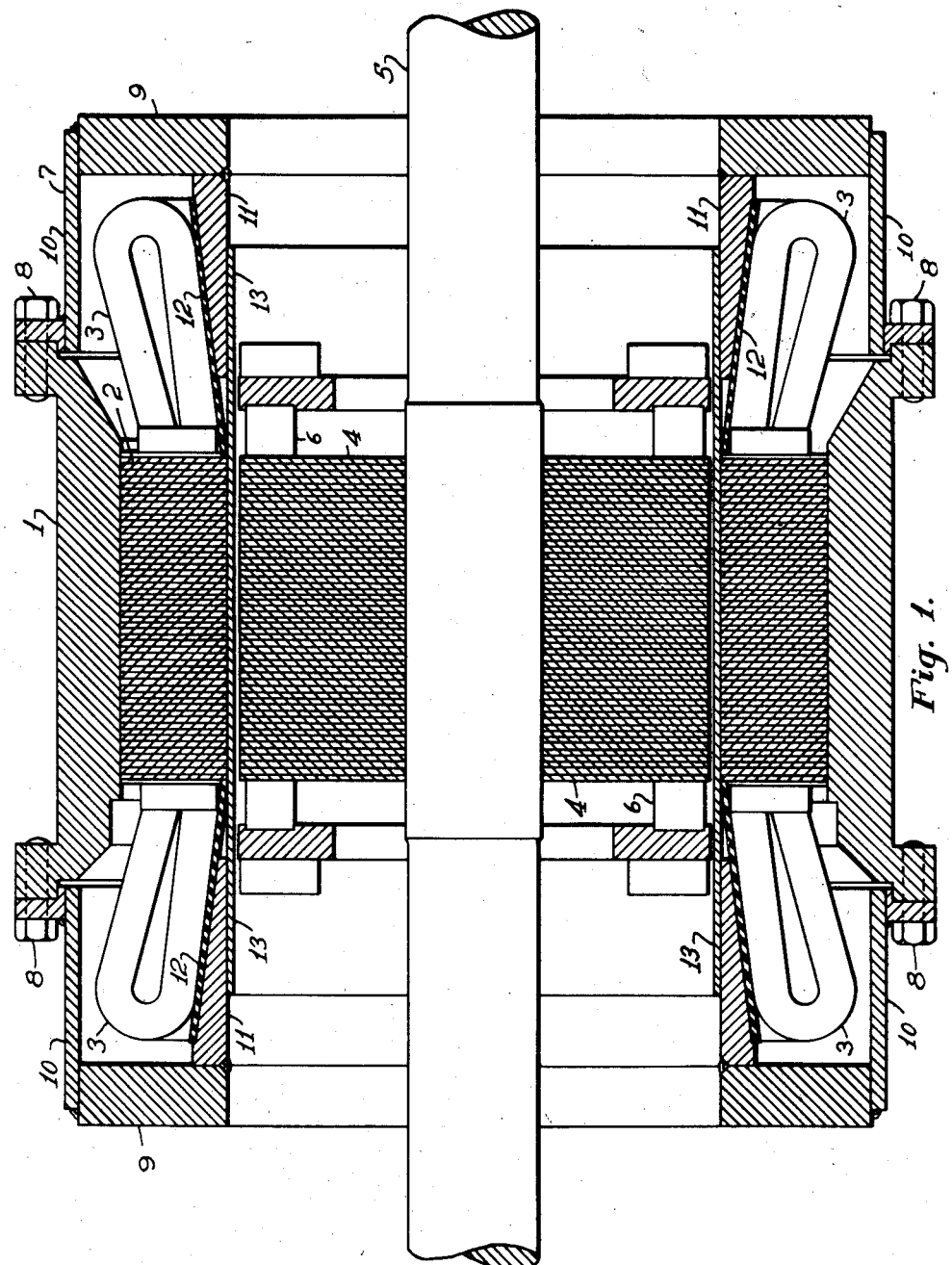

Sept. 8, 1942.  F. J. JOHNS  2,295,404
DYNAMO-ELECTRIC MACHINE
Filed July 19, 1940  2 Sheets-Sheet 1

WITNESSES:
Edward Michaels
F. P. Lyle

INVENTOR
*Francis J. Johns.*
BY O. B. Buchanan
ATTORNEY

Sept. 8, 1942.   F. J. JOHNS   2,295,404
DYNAMO-ELECTRIC MACHINE
Filed July 19, 1940   2 Sheets-Sheet 2

WITNESSES:
Edward Michaels
F. P. Lyle

INVENTOR
Francis J. Johns.
BY O. B. Buchanan
ATTORNEY

Patented Sept. 8, 1942

2,295,404

UNITED STATES PATENT OFFICE 2,295,404

DYNAMOELECTRIC MACHINE

Francis J. Johns, Pittsburgh, Pa., assignor to Westinghouse Electric & Manufacturing Company, East Pittsburgh, Pa., a corporation of Pennsylvania Application July 19, 1940, Serial No. 346,245

3 Claims. (Cl. 172—36)

The present invention relates to the construction of dynamo-electric machines and, more particularly, to alternating-current electric motors which are intended for operation in or exposed to an oxidizing or corrosive gas.

It is sometimes necessary to use electric motors for applications where they are operated in an atmosphere of oxidizing gas or where they are exposed to the action of such gases. Examples of such applications are motors used for driving gas pumps handling chemically active gases, and motors employed for driving other equipment used in carrying out certain chemical processes. When electric motors of the usual construction are used under these conditions, the gas to which the motor is exposed attacks the insulation of the motor windings and rapidly weakens it. For this reason, great difficulty has been experienced in the use of electric motors operating in an atmosphere of oxidizing gas because of frequent failure of the stator windings as the result of the chemical action of the gas on the insulation. This has necessitated frequent replacement of the windings, causing considerable difficulty and expense as well as loss of time.

The principal object of the present invention is to provide an electric motor which can be operated in an atmosphere of oxidizing or corrosive gas without damage to the windings and with a minimum of maintenance.

A more specific object of the invention is to provide a motor for operation in an atmosphere of oxidizing gas in which the windings are enclosed in a gas-tight chamber which protects them from the gas. The enclosure for the windings is preferably formed by means of a cylindrical shell which extends through the air gap of the motor and which cooperates with the end brackets to form a gas-tight chamber.

It is often necessary to operate motors of this type in gases which are under relatively high pressure and the gas-tight chamber must be capable of withstanding such pressures. Since the cylindrical shell which completes the chamber extends through the air gap, however, eddy currents are induced in it, and it must be made as thin as possible in order to keep the losses to a minimum, so that its mechanical strength is relatively low. It is, accordingly, a further object of the invention to provide a motor construction of the type described above which is capable of withstanding high gas pressures but in which the cylindrical shell which forms the enclosure for the windings can be made very thin to keep the eddy current losses to a minimum.

Figure 2:
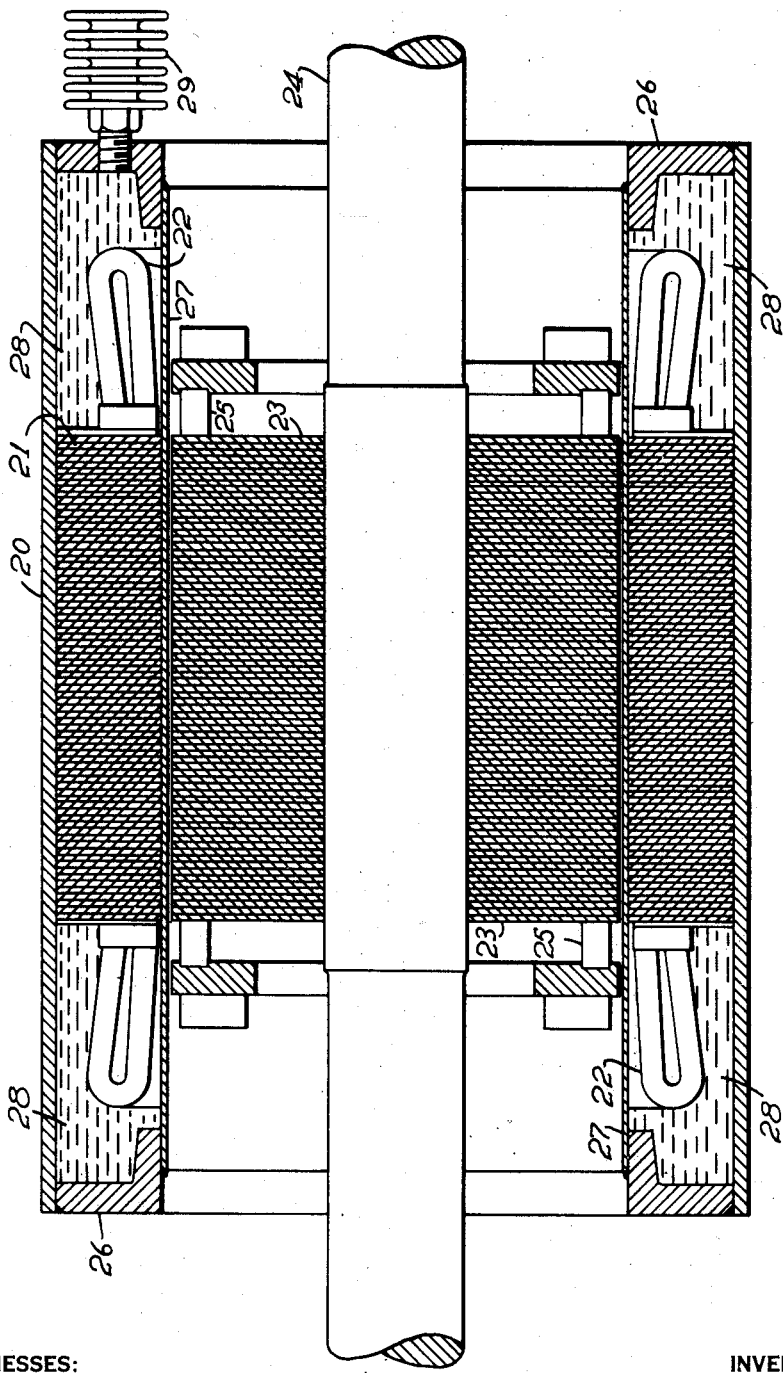

Further objects and advantages of the invention will be apparent from the following detailed description, taken in connection with the accompanying drawings, in which:

Figure 1 is a longitudinal sectional view of an alternating-current electric motor showing one embodiment of the invention; and Fig. 2 is a similar view showing another embodiment of the invention.

The alternating-current motor shown in Fig. 1 is designed for operation in an atmosphere of chemically active gas which would attack the insulation of the stator windings, or in locations where it is exposed to the action of such gases. This motor has a generally cylindrical stator frame 1 in which is supported a laminated stator core 2 of any suitable or usual construction. Suitable stator windings 3 are placed in slots in the core 2 in the usual manner. The rotor member consists of a laminated rotor core 4 secured to a shaft 5 which may be supported for rotation in external bearings of any suitable type. A squirrel-cage winding indicated at 6 is placed in slots in the rotor core 4.

In order to protect the stator windings 3 from the action of oxidizing gases, the stator core and windings are completely enclosed in a gas-tight chamber. This chamber is formed in part by the end brackets 7 which are bolted or otherwise fastened to the frame 1, as indicated at 8, with a gas-tight joint. Each of the end brackets 7 is generally annular and has a U-shaped cross section, as clearly shown in the drawings. Each of the end brackets is preferably fabricated from a substantially thick, rigid, annular end-ring 9, the outer periphery of which is welded, or otherwise substantially hermetically joined, to an outer cylindrical member 10 which makes the gas-tight joint 8 with the stator frame 1, and hence with the outer periphery of the stator core 2. The inner peripheral portion of the end-ring 9 of each end bracket is substantially rigidly and hermetically joined, as by welding, to a substantially thick, rigid, inner conical member 11 having a cylindrical inner surface. The slope of the outer surface of the conical member 11 is such as to provide the necessary support for the stator windings 3, which rest against this member and are separated from it by a conical insulating member 12. It will be seen that the end brackets partially enclose the end turns of the windings 3 and also provide the necessary support for the windings. The gas-tight enclosure is completed by means of a thin cylindrical shell 13 which extends through the air gap of the motor and fits closely against the inner cylindrical surface of the stator core 2. The shell 13 overlaps the end brackets 7 a considerable distance at each end and is welded to the end brackets to form a gas-tight joint around the entire circumference so that the stator core 2 and windings 3 are completely sealed up in a gas-filled, substantially gas-tight chamber. The shell 13 is preferably made of a corrosion-resistant material which has low electrical conductivity in order to keep the eddy current losses in the shell as small as possible. It has been found that stainless steel is a very suitable material for this purpose because of its resistance to corrosion and its low electrical conductivity, which is only about 2.5% that of copper.

Since the shell extends through the air gap of the motor, eddy currents will be induced in it and in order to keep the losses as low as possible, the shell should be made very thin so that it has relatively low mechanical strength. The necessary support for the shell to enable it to withstand reasonable pressures without serious deformation is provided in this embodiment of the invention by the inner cylindrical surface of the stator core which supports the central portion of the shell, and by the end brackets at the ends of the shell which overlaps the brackets a considerable distance. With this construction the shell is adequately supported to withstand pressures considerably higher than atmospheric in spite of its thinness.

It will be seen, therefore, that the stator windings are completely protected from the effects of an oxidizing or other chemically active gas to which the motor may be exposed, and thus the difficulties caused by insulation failures in conventional types of motors used under these conditions are avoided. Any suitable means may be used for cooling the stator windings if desired, such as water coolers in the frame 1, or ribs on the frame to increase the radiation of heat from it. It is also possible in some cases to pass a stream of cool air through the chamber in which the windings are enclosed in order to ventilate them and increase the capacity of the machine.

The embodiment of the invention just described is suitable for use at atmospheric pressures and in locations where the motor is operated in an atmosphere of gas at moderate pressures above atmospheric and even as high as about 150 pounds per square inch. The embodiment of the invention shown in Fig. 2 is intended for operation in gases at very much higher pressures, such as 1000 pounds per square inch or more. The motor shown in Fig. 2 has a cylindrical stator frame 20 in which is supported a laminated stator core 21 of any suitable or usual construction. Suitable stator windings 22 are placed in slots in the core 21 in the usual manner. As before, the rotor member has a laminated rotor core 23 secured to a shaft 24 which is supported for rotation in suitable bearings and the rotor winding 25 is placed in slots in the rotor core.

In this embodiment of the invention, the gas-tight enclosure for the stator windings is formed by annular end brackets 26, which are welded in the ends of the frame 20, and a thin cylindrical shell 27, which extends through the air gap and is welded to the end brackets 26 with a gas-tight joint. As before, the shell 27 is preferably made of stainless steel or other corrosion-resistant material of low conductivity, and is made as thin as possible in order to keep the eddy current losses in it to a minimum. The shell 27 fits closely against the inside cylindrical surface of the stator core 21, and the frame 20, end brackets 26 and shell 27 form a gas-tight chamber in which the stator core 21 and windings 22 are enclosed so that the windings are completely protected from the injurious effects of a gas in which the motor operates or to which it may be exposed.

As previously explained, it is necessary to make the shell 27 as thin as possible in order to keep the losses low. This necessarily results in a shell which is rather weak mechanically so that it would be unable to withstand the high gas pressures for which this motor is particularly intended, and for this reason means must be provided to support the shell to prevent mechanical failure or excessive deformation. This is preferably done by filling the gas-tight chamber with an insulating liquid, indicated at 28, which may be either mineral oil or a suitable non-inflammable insulating compound, such as chlorinated diphenyl. A pressure equalizing device, shown as a Sylphon bellows 29, is provided at one end of the chamber and extends through the end bracket 26 at that end. Any other suitable type of pressure equalizing device, such as a flexible diaphragm, might also be used in place of the bellows 29. The bellows is exposed to the external gas pressure and has a sufficient amount of flexibility to automatically, by its flexibility, maintain the pressure of the liquid 28 in the chamber substantially equal to the external gas-pressure outside the chamber so that the pressure is equalized between the liquid in the chamber and the gas outside and the mechanical stress on the shell 27 is very small even though the motor is operating in gas at pressures as high as 1000 pounds per square inch. In this way the use of a very thin shell is made possible and the losses in the shell are kept low.

It will be seen that the motor shown in Fig. 2 embodies the same fundamental principle of design as the motor of Fig. 1 in that the windings are protected from the effects of the gas by enclosing them in a gas-tight chamber, but that the motor of Fig. 2 is suitable for operation at much higher gas pressures because the pressure in the gas-tight chamber is maintained equal to the external pressure so that the mechanical stresses on the thin shell which completes the enclosure are very small. As before, any suitable means for cooling the windings may be used, if desired, such as water coolers in the frame, external ribs to assist in radiating the heat, or other well known expedients.

It should now be apparent that a simple but very effective construction has been provided for protecting the windings of electric motors from oxidizing or other chemically active gases which would attack the insulation and cause rapid failure of the windings. It is to be understood, of course, that the invention is capable of various modifications and embodiments and is not limited to the two specific embodiments illustrated and described. The invention is not restricted, therefore, to the particular details of construction shown but, in its broadest aspect, it includes all equivalent modifications and embodiments which come within the scope of the appended claims.

I claim as my invention:

1. A dynamo-electric machine comprising a stator member and a rotor member, the stator member having a frame, an annular, slotted stator core supported in the frame, windings in the slots of the stator core, end brackets at each end of the frame enclosing the ends of the windings, each of said end brackets being of an approximately U-shaped section comprising an outer cylindrical member effecting a substantially gas-tight enclosure with respect to the outer periphery of the stator core, a substantially thick, rigid, annular end-ring substantially hermetically joined to the end of the outer cylindrical member, and a short, substantially thick, rigid, inner cylindrical portion substantially rigidly and hermetically joined to the inner peripheral portion of the annular end-ring of the end bracket, and a relatively thin cylindrical shell extending through the core between the end brackets, said shell fitting closely against the inside cylindrical surface of the core and being joined to the inner surfaces of the inner cylindrical portions of said end brackets to form a gas-tight chamber enclosing the stator core and windings.

2. A dynamo-electric machine comprising a stator member and a rotor member, the stator member having a frame, an annular, slotted stator core supported in the frame, windings in the slots of the stator core, end brackets at each end of the frame enclosing the ends of the windings, each of said end brackets being of an approximately U-shaped section comprising an outer cylindrical member effecting a substantially gas-tight enclosure with respect to the outer periphery of the stator core, a substantially thick, rigid, annular end-ring substantially hermetically joined to the end of the outer cylindrical member, and a substantially thick, rigid, inner cylindrical portion substantially rigidly and hermetically joined to the inner peripheral portion of the annular end-ring, said inner cylindrical member extending towards the stator core under the ends of the windings, and a thin cylindrical shell extending through the core between the end brackets, the central portion of said shell fitting closely against the inside cylindrical surface of the core to be supported thereby, and the end portions of the shell overlapping the inner cylindrical portions of the end brackets to be supported by the end brackets, and said shell being joined to said inner cylindrical portions of the end brackets to form a gas-tight chamber enclosing the stator core and windings.

3. A dynamo-electric machine comprising a stator member and a rotor member, the stator member having a frame, an annular, slotted stator core supported in the frame, windings in the slots of the stator core, end brackets at each end of the frame enclosing the ends of the windings, each of said end brackets being of an approximately U-shaped section comprising an outer cylindrical member effecting a substantially gas-tight enclosure with respect to the outer periphery of the stator core a substantially thick, rigid, annular end-ring substantially hermetically joined to the end of the outer cylindrical member, and a short, substantially thick, rigid, inner cylindrical portion substantially rigidly and hermetically joined to the inner peripheral portion of the annular end-ring of the end bracket, and a relatively thin cylindrical shell extending through the core between the end brackets, said shell fittingly closely against the inside cylindrical surface of the core and being joined to the inner surfaces of the inner cylindrical portions of said end brackets to form a gas-tight chamber enclosing the stator core and windings, said chamber being filled with an insulating liquid, and means for maintaining the pressure of said liquid within the chamber substantially equal to the external pressure.

FRANCIS J. JOHNS.